United States Patent
Scharpf et al.

[11] Patent Number: 5,388,395
[45] Date of Patent: Feb. 14, 1995

[54] USE OF NITROGEN FROM AN AIR SEPARATION UNIT AS GAS TURBINE AIR COMPRESSOR FEED REFRIGERANT TO IMPROVE POWER OUTPUT

[75] Inventors: Eric W. Scharpf, Emmaus; Frederick C. Flemming, Macungie, both of Pa.

[73] Assignee: Air Products and Chemicals, Inc., Allentown, Pa.

[21] Appl. No.: 54,775

[22] Filed: Apr. 27, 1993

[51] Int. Cl.6 .......................... F02C 3/28; F02C 7/14
[52] U.S. Cl. ................................ 60/39.02; 60/39.12; 60/728
[58] Field of Search ............... 60/39.02, 39.12, 39.182, 60/728, 39.83

[56] References Cited

U.S. PATENT DOCUMENTS

| | | | |
|---|---|---|---|
| 3,731,495 | 5/1973 | Coveney | 62/39 |
| 3,788,066 | 1/1974 | Nebgen | 60/39.05 |
| 3,796,045 | 3/1974 | Foster-Pegg | 60/39.02 |
| 3,877,218 | 4/1975 | Nebgen | 60/39.05 |
| 4,019,314 | 4/1977 | Springhmann | 60/39 |
| 4,224,045 | 9/1980 | Olszewski | 62/30 |
| 4,297,842 | 11/1981 | Gerhold | 60/39.06 |
| 4,424,667 | 1/1984 | Fanning | 60/39.181 |
| 4,631,915 | 12/1986 | Frewer | 60/39.12 |
| 4,651,519 | 3/1987 | Goebel | 60/39 |
| 4,697,413 | 10/1987 | Pohl | 60/39.02 |
| 4,697,415 | 10/1987 | Schiffers | 60/39 |
| 4,707,994 | 11/1987 | Shenoy | 62/11 |
| 4,729,217 | 3/1988 | Kehlhofer | 60/39 |
| 4,861,369 | 8/1989 | Bogdandy et al. | 60/39.12 |
| 5,076,837 | 12/1991 | Rathbone | 75/39.12 |
| 5,081,845 | 1/1992 | Allam | 62/24 |

FOREIGN PATENT DOCUMENTS

| | | |
|---|---|---|
| 1238195 | 6/1988 | Canada . |
| 0137152 | 12/1989 | European Pat. Off. . |
| 2067668 | 7/1981 | United Kingdom . |

OTHER PUBLICATIONS

Tatge et al. *Gas Turbine Air Inlet Treatment* General Electric Co., New York, 1980, p. 21.

*Primary Examiner*—Louis J. Casaregola
*Attorney, Agent, or Firm*—Willard Jones, II

[57] ABSTRACT

The present invention is an improvement to a process for the production of work to generate electricity or to drive a mechanical device using a gas turbine. In the process, feed air stream is compressed and combusted with a fuel gas to produce a combustion product. This combustion product is expanded in a gas turbine expander, thereby producing a hot exhaust gas and work. This produced work is used to generate electricity or to drive a mechanical device. The improvement to the process, which increases the work produced by the gas turbine expander, is characterized by cooling nitrogen product, produced by a cryogenic air separation unit to a subambient temperature and combining this subambient cooled, nitrogen product with the feed air stream prior to compression. The improvement of the present invention is particularly suited to the process, wherein at least a portion of the oxygen product produced by the cryogenic air separation unit is reacted with a carbonaceous feedstock in a gasification unit to produce the fuel gas, which is rich in carbon monoxide and hydrogen. The carbonaceous feedstock reacted in the gasifier unit can be coal, petroleum coke, tar sands bitumen, tar sand emulsion, municipal wastes, petroleum residua, waste oil or mixtures thereof.

13 Claims, 2 Drawing Sheets

USE OF NITROGEN FROM AN AIR SEPARATION UNIT AS GAS TURBINE AIR COMPRESSOR FEED REFRIGERANT TO IMPROVE POWER OUTPUT

The present invention relates to a gas turbine process for the production of work to generate electricity or to drive a mechanical device. More specifically, the present invention relates to a process for using the nitrogen from a cryogenic air separation process as a feed gas to the air compressor of the gas turbine in the gas turbine process.

BACKGROUND OF THE INVENTION

Oxygen-blown gasification of coal, petroleum coke, residual oil, oil emulsions, tar sands and the like in gasification combined cycle (GCC) power plants generate a large flow of excess nitrogen associated with the production of oxygen feed for the gasification reaction. One difficulty confronting industry is to make the most efficient use of this effectively free excess nitrogen in the GCC facility. Other related difficulties in GCC technology include the continuing drive for more generating capacity at increasingly greater efficiencies and the imposition of severe limits on $NO_x$ emissions to the atmosphere. Finally, as existing GCC facilities' capacity, efficiency, and $NO_x$ emission rates become inadequate to meet increasingly strict future demands, there is a need for inexpensive retrofitting modifications to meet these new, more stringent requirements. The present invention allows the use of the available excess nitrogen in a GCC power plant to increase power generation capacity and improve power generation efficiency with minimum additional capital costs in both new grass roots plants and in re-powering/retrofitting applications.

There are several methods for utilizing nitrogen in a GCC power plant. The simplest method is to vent the excess nitrogen to the atmosphere. The simple venting of the nitrogen is employed when minimum integration or no integration between the air separation unit and the gas turbine is desired.

Another method is described in U.K. Pat. No. 2,067,668. This method consists of returning the excess nitrogen at unspecified temperature to the inlet of the gas turbine air compressor with the sole expressed purpose of reducing $NO_x$ generation. This same method is also disclosed in U.S. Pat. No. 4,297,842.

Still another method is to pass the nitrogen through an auxiliary compressor to inject it into the gas turbine fuel stream which reduces $NO_x$ generation by reducing the flame temperature in the combustor. This practice is disclosed in U.S. Pat. No. 5,081,845, European Pat. No. 0,137,152 and in U.S. Pat. No. 4,224,045. This method requires a costly auxiliary compression system, so, implementation is expensive. Also, since nitrogen injection into the fuel stream typically requires nitrogen pressures of 50–150 psi higher than the 200–250 psia combustion pressure, this practice requires excessive compression with much of the energy wasted as pressure drop to the combustor.

Direct injection of the nitrogen into the combustor of the gas turbine to reduce $NO_x$ is another commonly used method in GCC. U.S. Pat. No. 4,729,217, U.S. Pat. No. 4,707,994, U.S. Pat. No. 4,697,415, U.S. Pat. No. 4,651,519, U.S. Pat. No. 4,631,915 and Canadian Pat. No. 1,238,195 describe the method and several minor variations thereof. This method does reduce $NO_x$ formation, but also requires expensive auxiliary compression to excessive pressures.

Some methods involve heating and compressing the nitrogen before injection directly into the gas turbine expander to generate additional motive flow. U.S. Pat. No. 5,081,845, U.S. Pat. No. 5,076,837, U.S. Pat. No. 4,019,314 and U.S. Pat. No. 3,731,495 by provide a detailed description of these methods. These methods do presumably improve power generating efficiency, but require expensive additional compression equipment and reduce the thermodynamic efficiency of the main expander.

Another scheme for use of the nitrogen stream is described in U.S. Pat. No. 4,697,413. This scheme involves using an auxiliary compressor to feed the nitrogen to the coal gasifier to quench the high temperature reaction.

Other uses for the nitrogen stream involve synthesis of compounds like ammonia that use the nitrogen as a feed stream. These processes all require expensive additional process equipment and add extreme complexity to the overall process so they will not be described here. Some gasification systems employ a small part of the nitrogen to facilitate dry materials transport, but this only uses a small fraction of the available nitrogen, so these systems and their processes will not be described here.

As further background, several processes are known in the art for refrigerating the gas turbine air compressor feed. These processes, which involve expensive, complicated auxiliary equipment, are taught by U.S. Pat. Nos. 3,788,066; 3,796,045; 3,877,218 and 4,424,667.

SUMMARY OF THE INVENTION

The present invention is an improvement to a process for the production of work to generate electricity or to drive a mechanical device using a gas turbine. In the process, feed air stream is compressed and combusted with a fuel gas to produce a combustion product. This combustion product is expanded in a gas turbine expander, thereby producing a hot exhaust gas and work. This produced work is used to generate electricity or to drive a mechanical device.

The improvement to the process, which increases the work produced by the gas turbine expander, is characterized by cooling nitrogen product produced by a cryogenic air separation unit to a subambient temperature and combining this subambient cooled, nitrogen product with the feed air stream prior to compression.

The improvement of the present invention is particularly suited to the process, wherein at least a portion of the oxygen product produced by the cryogenic air separation unit is reacted with a carbonaceous feedstock in a gasification unit to produce the fuel gas, which is rich in carbon monoxide and hydrogen. The carbonaceous feedstock reacted in the gasifier unit can be coal, petroleum coke, tar sands bitumen, tar sand emulsion, municipal wastes, petroleum residua, waste oil or mixtures thereof.

The process of the present invention can further comprise a combined cycle option, wherein the hot exhaust gas is cooled to generate steam, which in turn is expanded to generate electricity.

There are two primary embodiments of the improvement. The first is applicable to an air separation unit producing a nitrogen product at an elevated pressure, i.e., when the nitrogen product is produced at a pressure at least 3 psi higher than the pressure of the gas turbine air compressor inlet. In this embodiment, the nitrogen product is expanded, thereby producing a cooled, nitrogen product and electricity. The cooled nitrogen product is mixed with the feed air entering the gas turbine air compressor inlet.

The second embodiment is particularly applicable to an air separation unit producing a nitrogen product at typically low pressure, i.e., when the product nitrogen is produced at a pressure between about 0.5 and 3 psi higher than the pressure of the gas turbine air compressor inlet, but is applicable to an air separation unit producing a nitrogen product at an elevated pressure. In the second embodiment, the nitrogen product is cooled and saturated by direct contact with water. The cooled nitrogen product is mixed with the feed air entering the gas turbine air compressor inlet.

Finally, the two improvement embodiments can be both incorporated in the process of the present invention. In other words, elevated pressure nitrogen product is expanded and then further cooled and saturated by contact with water in a cooler/saturator.

DETAILED DESCRIPTION OF THE INVENTION

The present invention is an improvement to a process for the production of work using a gas turbine either in a simple or a combined cycle configuration. The improvement is particularly suited to the process, wherein at least a portion of the oxygen product produced by the cryogenic air separation unit is reacted with a carbonaceous feedstock in a gasification unit to produce the fuel gas, which is rich in carbon monoxide and hydrogen. The carbonaceous feedstock reacted in the gasifier unit can be coal, petroleum coke, tar sands bitumen, tar sand emulsion, municipal wastes, petroleum residua, waste oil or mixtures thereof.

The improvement efficiently uses the excess nitrogen from an air separation unit. As stated above, the improvement to the process in its broadest sense comprises cooling at least a portion of the nitrogen product from the air separation unit and combining such cooled, nitrogen product with the feed air being fed to the gas turbine air compressor. In order to fully understand the improvement of the present invention, it will be discussed in detail with reference to two embodiments.

The improvement to the process, in its primary embodiment, takes the waste nitrogen stream produced by an elevated pressure air separation unit and passes it through an expander to generate power and to chill the nitrogen stream to subambient temperatures. The chilled stream is then fed to the inlet of the air compressor for the gas turbine, displacing some of the ambient temperature air feed. This modification cools and densities the gas turbine compressor feed, increasing the total gas throughput of the gas turbine compressor. As a side effect, since the nitrogen stream is depleted in oxygen relative to the normal feed air to the gas turbine compressor, the oxygen content of the oxidant will be reduced, resulting in lower peak flame temperatures that will in turn result in lower $NO_x$ generation. A flow diagram of this process is shown in FIG. 1.

Figure 1:
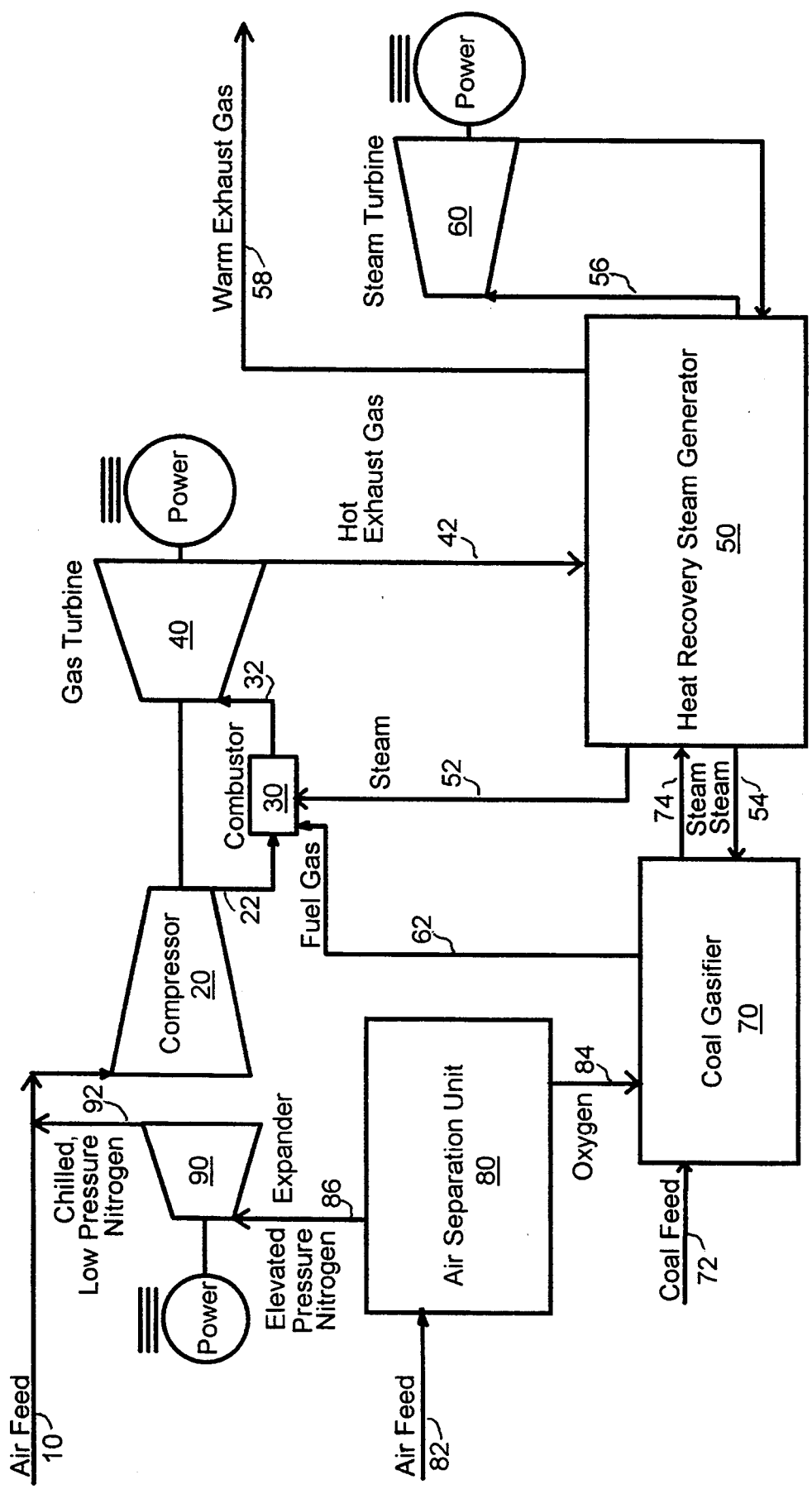
FIGS. 1 and 2 are schematic diagrams of two embodiments of the process of the present invention.

With reference to FIG. 1, feed air, in line 10, and chilled, low pressure nitrogen, in line 92, are compressed in gas turbine air compressor 20 to produce a compressed, combustion air stream. This compressed, combustion air stream, in line 22, is then fed to and combusted with fuel gas, in line 62, and, optionally, steam, in line 52, in combustor 30 producing a combustion product stream. This combustion product stream, in line 32, is fed to and expanded in gas turbine expander 40 thereby producing a hot exhaust gas stream and electricity. Typically, gas turbine expander 40 and gas turbine air compressor 20 are mechanically linked.

Both the hot exhaust gas stream, in line 42, and steam from coal gasifier 70, in line 74, are fed to heat recovery steam generator 50. It is important to note that although the embodiments of the present invention are being described with reference to use of coal gasifier 70, this gasifier could be one which processes any carbonaceous feedstock. The purpose of the heat recovery steam generator is to recover heat from the hot exhaust gas stream and the steam from the coal gasifier, to produce electricity and appropriate level steam for use elsewhere in the process. For example, some of the steam can be used to regenerate the thermal swing adsorbers in air separation unit 80. A warm exhaust gas is vented, via line 58, from heat recovery steam generator 50.

In gasifier 70, a carbonaceous feedstock such as coal, in line 72, and oxygen, in line 84, are reacted to produce a synthesis gas rich in hydrogen and carbon monoxide. This synthesis gas comprises the fuel gas, in line 62, used in the combustor.

In air separation unit 80, compressed air, in line 82, is cryogenically separated into an elevated pressure, oxygen product and an elevated pressure, nitrogen product. It is important to note in the present invention that the source of the compressed air, in line 82, can be from a stand alone air compressor or in whole or in part from compressor 20. The elevated pressure, oxygen product, in line 84, is fed to coal gasifier 70. The elevated pressure, nitrogen product, in line 86, is expanded in expander 90, thereby producing a chilled, low pressure nitrogen stream, in line 92, while producing work to generate electricity.

The preferred range of conditions for the elevated pressure nitrogen stream are: temperature less than 100° F. above ambient, pressure greater than 3 psi above the regular gas turbine compressor inlet, and total mass flow less than 20% of the total gas turbine compressor air feed mass flow rate. A typical total gas turbine compressor air feed mass flow rate for a 290 MW GCC system is about $3.3 \times 10^6$ lb/hr. The preferred range of conditions for the chilled low pressure nitrogen stream are: temperature less than ambient minus 10° F. and pressure slightly (<0.5 psi) greater than the gas turbine compressor inlet. There is no specific stream composition limitation but it preferably consists of nitrogen with lesser amounts of other gases including, but not limited to $H_2O$, $CO_2$, Ar, and $O_2$.

Figure 2:
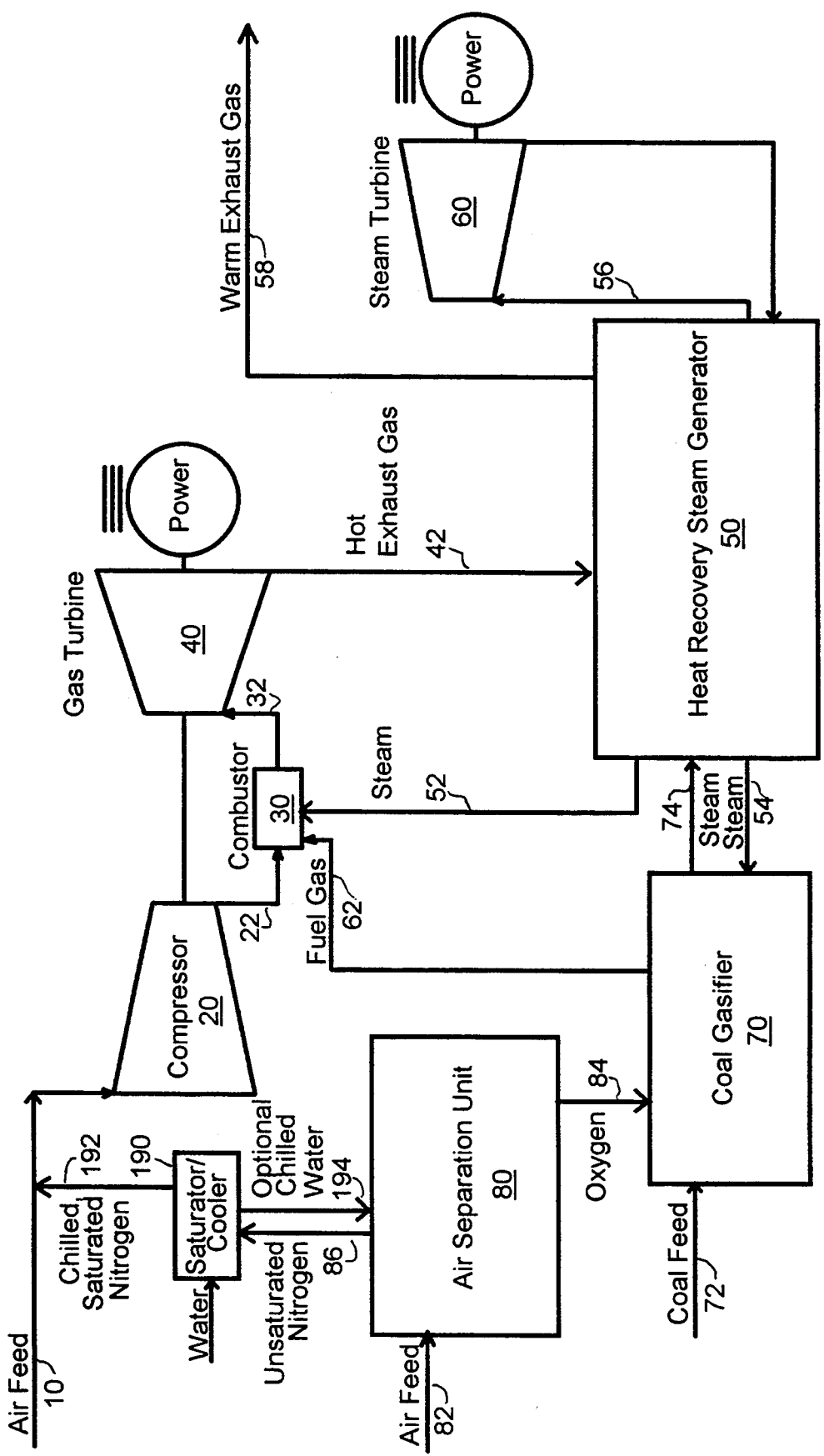

The improvement to the process, in the alternate embodiment, is particularly suited to the process when it utilizes an air separation unit operating at conventional low pressures and where the available nitrogen is not saturated with water. The alternative embodiment uses a saturation cooler to cool the nitrogen stream before it enters the gas turbine compressor inlet. This cooling and saturating has similar effects to those in the primary application described above. In addition, this saturator/cooler will increase the mass flow of the nitrogen stream and increase its heat capacity, further improving the process. This optional modification may be employed with low or elevated pressure nitrogen streams and, also, in conjunction with the primary expander configuration described above. Depending on the relative humidity of the main air feed, the saturator can be run to varying levels of saturation to prevent condensation problems in the gas turbine compressor. The flow diagram for this option (for a case without the primary expander) is shown in FIG. 2 with the key aspects of the modification highlighted by the shaded box. Similar process streams and equipment in FIGS. 1 and 2 share the same identification number.

With reference to FIG. 2, feed air, in line 10, and chilled, saturated nitrogen, in line 192, is compressed in gas turbine air compressor 20 to produce a compressed, combustion air stream. This compressed, combustion air stream, in line 22, is then fed to and combusted with fuel gas, in line 62, and, optionally, steam, in line 52, in combustor 30 producing a combustion product stream. This combustion product stream, in line 32, is fed to and expanded in gas turbine expander 40 thereby producing a hot exhaust gas stream and electricity. Typically, gas turbine expander 40 and gas turbine air compressor 20 are mechanically linked.

Both the hot exhaust gas stream, in line 42, and steam from coal gasifier 70, in line 74, are fed to heat recovery steam generator 50. The purpose of the heat recovery steam generator is to recover heat from the hot exhaust gas stream and the steam from the coal gasifier, to produce electricity and appropriate level steam for use elsewhere in the process. A warm exhaust gas is vented, via line 58, from heat recovery steam generator 50.

In gasifier 70, a carbonaceous feedstock such as coal, in line 72, and oxygen, in line 84, are reacted to produce a synthesis gas rich in hydrogen and carbon monoxide. This synthesis gas comprises the fuel gas, in line 62, used in the combustor.

In air separation unit 80, compressed air, in line 82, is cryogenically separated into an oxygen product and a low pressure, nitrogen product. It is important to note in the present invention, the source of the compressed air, in line 82, can be in whole or in part from compressor 20. The oxygen product, in line 84, is fed to coal gasifier 80. The low pressure, nitrogen product, in line 86, is chilled and saturated with water in saturator/cooler 190, thereby producing a chilled, water saturated nitrogen stream, in line 192.

The preferred range of conditions for the unsaturated nitrogen stream are: temperature less than 20° F. above ambient, pressure greater than 0.5 psi above regular compressor feed, less than 50% relative humidity, and total mass flow less than 20% of gas turbine compressor air feed mass flow rate. A typical total gas turbine compressor air feed mass flow rate for a 290 MW GCC system is about $3.3 \times 10^6$ lb/hr. The preferred range of conditions for the chilled saturated nitrogen stream are: temperature less than ambient minus 10° F. and pressure greater than regular compressor feed pressure. The water feed to the saturator is preferably at the boiler feed water make up temperature or the cooling water inlet temperature, whichever is colder, and has a gross flow rate of less than 10% of the nitrogen flow rate ($< \sim 6.6 \times 10^4$ lb/hr water flow for a 290 MW GCC plant.) Any excess water flow can be recycled back to the saturator/cooler inlet since this water is at reduced temperature and thus will more effectively cool the nitrogen stream. Without water recycle, the water flow can provide excess chilled water coolant in the air separation unit. This additional option is shown by flow stream line 194 in FIG. 2. The excess water flow can be controlled so as to divide the cooling capacity between the air separation unit and the gas turbine system in the most efficient way. There is no other specific gas stream composition limitation, but the nitrogen stream preferably contains a plurality of nitrogen with lesser amounts of other gases including, but not limited to $H_2O$, $CO_2$, Ar and $O_2$.

The improvement of the present invention also comprises combining the above two specific embodiments. In this case, elevated pressure nitrogen is expanded in an expander to cool the nitrogen and produce electricity and then the cooled, expanded nitrogen is further cooled and saturated by contact with water in a cooler/saturator.

The present invention is of value in that it provides increased power generation output at a minimum cost without introducing undesired complexity and unreliability. Table 1 summarizes the advantages of the invention relative to a base case without integration of the nitrogen waste stream as calculated through a computer simulation. The system chosen for simulation consists of a gas turbine, a heat recovery steam generation system, a triple pressure 1450 psig/1000° F./1000° F. reheat extraction-induction condensing steam turbine, an integrated coal gasification system, and either an elevated pressure or a low pressure air separation unit (ASU in Table 1). The base case plant is designed for ISO ambient conditions (59° F., 14.7 psia, and 60% relative humidity, 65° F. cooling water) and no integration between the air separation unit and the rest of the plant. Summer ambient conditions best demonstrate the increased power capacity of the invention and are defined to be 90° F. ambient, 14.7 psia, and 50% relative humidity.

TABLE I

| | Gross Gas Turbine Power: MW | Gross Steam Turbine Power: MW | Gas + Steam Turbines Heat Rate: BTU/kWh | ASU Power Demand Change: MW | Total Net Power Output Change: MW | Increased Capital Cost: k$ | Summer Incremental Power Cost: $/kW | Estimated NOx: vppm |
|---|---|---|---|---|---|---|---|---|
| ISO Base Case | 191.4 | 104.1 | 5858 | Not Applicable | Not Applicable | Not Applicable | Not Applicable | 25 |
| Summer Base Case | 173.0 | 95.2 | 6001 | Base Case | Base Case | Base Case | Base Case | 25 |
| Summer Case 1A | 167.7 | 99.7 | 5922 | 1.6 | −2.3 | 1500 | Not Applicable | 25 |
| Summer Case 1B | 181.0 | 96.3 | 6004 | 2.8 | +6.1 | 1500 | 246 | 9 |
| Summer Case 2 | 174.4 | 95.5 | 6004 | 0.1 | +1.6 | 420 | 263 | 9 |

Note: ASU = Air Separation Unit and Heat Rate = the BTU/hr heating value of the fuel input per kW of electric power output The primary invention with an expander and an elevated pressure air separation unit design, shown in FIG. 1 in the description of the invention, was evaluated under two conditions listed above as Option 1A and 1B. Option 1A shows the benefits of the invention at summer conditions when the total plant efficiency is maximized. For this option, the gas turbine and steam turbine heat rate based on syngas fuel value can be improved from 6001 BTU/kWh to 5922 BTU/kWh, or by 79 BTU/kWh at a cost of 2.3 MW of capacity reduction. Option 1B shows the benefits of the invention at summer conditions when the total plant power output is maximized. For this option, the total net power output for the plant can be increased by 6.1 MW (~2.3%) with essentially no efficiency loss and an incremental capital cost of only 246 $/kW.

The performance of the optional configuration of the invention with a saturator/cooler and a low pressure air separation design, as shown in FIG. 2, is listed above as Option 2. This option was evaluated at summer conditions with maximum cooling sent to the chilled, saturated nitrogen stream. Option 2 has the benefit of increasing total plant net power output by 1.6 MW (0.6%) at summer conditions with an incremental capital cost of only 263 $/kW.

The primary advantage of the invention is the increase in summer peak generation capacity at costs significantly less than typical base load costs of ~$1500/kW. This is the result of the significant leverage between the relatively low cost to increase gas turbine compressor mass flow and its relatively large effect on total power output.

Another advantage of the present invention is that the gas turbine $NO_x$ emission level can be reduced from 25 to 9 vppm.

Another significant advantage of this invention is that it introduces a minimum additional level of complexity to a non-integrated process since the only integration point is at the gas turbine air compressor inlet. Thus, the entire plant can still be operated at the non-integrated output level even if the equipment used to implement this invention is taken out of service. In the power generating industry, process reliability and minimal unplanned down time have extremely high value, so this feature is a clear advantage. Also, since the implementation of this invention does not significantly disturb the process flow sheet, it can be easily and affordably added as a retrofit to an existing nonintegrated GCC plant.

The improvement to the process of the present invention has been described with reference to two specific embodiments thereof. These embodiments should not be viewed as a limitation of the present invention. Any limitation on the present invention should be ascertained from the following claims.

We claim:

1. A process for the production of work to generate electricity or to drive a mechanical device using a gas turbine, wherein a feed air stream is compressed and combusted with a fuel gas to produce a combustion product, wherein the combustion product is expanded in a gas turbine expander, thereby producing a hot exhaust gas and producing work and wherein the produced work is used to generate electricity or to drive a mechanical device, characterized by cooling nitrogen product produced by a cryogenic air separation unit to a subambient temperature, and combining the subambient cooled, nitrogen product with the feed air stream prior to compression thereby increasing the work produced in the gas turbine expander.

2. The process of claim 1, wherein the cryogenic air separation unit also produces an oxygen product and wherein at least a portion of the oxygen product is reacted with a carbonaceous feedstock in a gasification unit to produce the fuel gas rich in carbon monoxide and hydrogen.

3. The process of claim 1 further comprises a combined cycled configuration, wherein the hot exhaust gas is cooled to generate steam, which in turn is expanded to generate electricity.

4. The process of claim 2 further comprises a combined cycled configuration, wherein the hot exhaust gas is cooled to generate steam, which in turn is expanded to generate electricity.

5. The process of claim 2, wherein the carbonaceous feedstock is coal, petroleum coke, tar sands bitumen, tar sand emulsion, municipal wastes, petroleum residua, waste oil or mixtures thereof.

6. The process of claim 1, wherein the nitrogen product is produced at an elevated pressure and the elevated pressure, nitrogen product is expanded to produce the subambient cooled, nitrogen product and electricity.

7. The process of claim 1, wherein the nitrogen product is produced at a low pressure and the low pressure, nitrogen product is contacted with water in a cooler/saturator to produce the subambient cooled, nitrogen product.

8. The process of claim 1, wherein the nitrogen product is produced at an elevated pressure and the elevated pressure, nitrogen product is contacted with water in a cooler/saturator to produce the subambient cooled, nitrogen product.

9. The process of claim 1, wherein the nitrogen product is produced at an elevated pressure and the elevated pressure, nitrogen product is expanded thereby producing a cooled expanded, nitrogen product and electricity and the cooled expanded, nitrogen product is then contacted with water in a cooler/saturator to produce the subambient cooled, nitrogen product.

10. The process of claim 2, wherein the nitrogen product is produced at an elevated pressure and the elevated pressure, nitrogen product is expanded to produce the subambient cooled, nitrogen product and electricity.

11. The process of claim 2, wherein the nitrogen product is produced at a low pressure and the low pressure, nitrogen product is contacted with water in a cooler/saturator to produce the subambient cooled, nitrogen product.

12. The process of claim 2, wherein the nitrogen product is produced at an elevated pressure and the elevated pressure, nitrogen product is contacted with water in a cooler/saturator to produce the subambient cooled, nitrogen product.

13. The process of claim 2, wherein the nitrogen product is produced at an elevated pressure and the elevated pressure, nitrogen product is expanded, thereby producing a cooled expanded, nitrogen product and electricity and the cooled expanded, nitrogen product is then contacted with water in a cooler/saturator to produce the subambient cooled, nitrogen product.

* * * * *